US012575664B2

(12) United States Patent
Xing et al.

(10) Patent No.: US 12,575,664 B2
(45) Date of Patent: Mar. 17, 2026

(54) INTELLIGENT DUAL-MODE ELECTRIC FLOOR BRUSH

(71) Applicant: Suzhou Rongxuan Electric Co., Ltd, Suzhou (CN)

(72) Inventors: Tianbo Xing, Suzhou (CN); Jundong Xing, Suzhou (CN)

(73) Assignee: Suzhou Rongxuan Electric Co., Ltd, Suzhou (CN)

( * ) Notice: Subject to any disclaimer, the term of this patent is extended or adjusted under 35 U.S.C. 154(b) by 0 days.

(21) Appl. No.: 19/289,401

(22) Filed: Aug. 4, 2025

(65) Prior Publication Data

US 2025/0359657 A1 Nov. 27, 2025

(30) Foreign Application Priority Data

Jul. 18, 2025 (CN) .......................... 202521509316.3

(51) Int. Cl.
*A46B 15/00* (2006.01)
*A46B 13/02* (2006.01)
*A47L 9/28* (2006.01)
*H02P 23/00* (2016.01)

(52) U.S. Cl.
CPC .......... *A46B 15/0004* (2013.01); *A46B 13/02* (2013.01); *A47L 9/2831* (2013.01); *A47L 9/2847* (2013.01); *H02P 23/00* (2013.01); *A46B 2200/3033* (2013.01)

(58) Field of Classification Search
CPC ................. A46B 15/0004; A46B 13/02; A46B 2200/3033; A47L 9/2831; A47L 9/2847; H02P 23/00

USPC ........................................................... 318/504
See application file for complete search history.

(56) References Cited

U.S. PATENT DOCUMENTS

| | | | |
|---|---|---|---|
| 12,445,101 B2* | 10/2025 | Chen | H03G 3/3036 |
| 2008/0276415 A1 | 11/2008 | Florent | |
| 2010/0283423 A1* | 11/2010 | Boyadjieff | H02P 27/16 |
| | | | 318/729 |
| 2012/0273290 A1* | 11/2012 | Kawano | B62D 5/0487 |
| | | | 180/443 |
| 2015/0061553 A1* | 3/2015 | Lee | H02P 6/181 |
| | | | 318/400.04 |
| 2015/0265121 A1* | 9/2015 | Kim | H02P 6/20 |
| | | | 318/504 |
| 2015/0311832 A1* | 10/2015 | Solodovnik | H04L 12/433 |
| | | | 318/51 |
| 2017/0015207 A1* | 1/2017 | Houda | H02M 1/44 |

(Continued)

*Primary Examiner* — Kawing Chan
(74) *Attorney, Agent, or Firm* — Hemisphere Law, PLLC

(57) ABSTRACT

The present disclosure discloses an intelligent dual-mode electric floor brush. The intelligent dual-mode electric floor brush includes a control circuit, where the control circuit is connected between a power supply and a floor brush motor, and the control circuit includes: a conversion unit that is connected to an output end of the power supply and an input end of the floor brush motor and converts a first voltage of the power supply to a second voltage; and a switch unit. The present disclosure is simple in structure, without complicated hardware such as a single chip microcomputer and an industrial personal computer, and low in production and manufacturing cost. In addition, cleaning efficiency can be improved, power consumption can be reduced, and a battery life of a vacuum cleaner can be prolonged.

12 Claims, 3 Drawing Sheets

(56) References Cited

U.S. PATENT DOCUMENTS

2023/0354990 A1  11/2023  Ma
2025/0040780 A1   2/2025  Chen et al.

* cited by examiner

INTELLIGENT DUAL-MODE ELECTRIC FLOOR BRUSH

TECHNICAL FIELD

The present disclosure relates to the technical field of cleaning tools, and in particular, to an intelligent dual-mode electric floor brush.

BACKGROUND OF THE INVENTION

An electric floor brush is an essential part of a vacuum cleaner, and is widely applied to various cleaning scenarios such as homes and business places. When working, the electric floor brush comes in direct contact with floors or carpets and clears dust and garbage from their surfaces. However, because the floors and carpets vary in resistance, the electric floor brush is required to change its output power according to the varying work scenarios. In the prior art, when recognizing different work scenarios, the electric floor brush often requires a camera or a sensor, and further requires a corresponding industrial personal computer or single chip microcomputer to control those visual devices. As a result, the complexity and the manufacturing cost of the electric floor brush are increased.

SUMMARY OF THE INVENTION

In order to overcome the above shortcomings, an objective of the present disclosure is to provide an electric floor brush simple in structure, convenient to control, high in cleaning efficiency, and desirable in energy-saving effect.

An intelligent dual-mode electric floor brush is provided by the present disclosure. The intelligent dual-mode electric floor brush includes a control circuit and a floor brush motor, where the control circuit is connected between a power supply and the floor brush motor to control a work voltage at the floor brush motor, and the control circuit includes:

a conversion unit that is connected to an output end of the power supply and an input end of the floor brush motor and converts a first voltage of the power supply to a second voltage;

a sampling unit connected to an output end of the floor brush motor, so as to generate a sampled voltage according to a sampled current at the floor brush motor;

a comparison unit connected to the sampling unit, where the comparison unit is configured to generate a reference voltage and compare the reference voltage with the sampled voltage to generate a switch voltage; and a switch unit that is connected to the comparison unit, the power supply, the conversion unit, and the floor brush motor and transmits the first voltage or the second voltage to the floor brush motor according to a state of the switch voltage.

In one or more examples of the present disclosure, the conversion unit includes a conversion circuit, a filter circuit, and a voltage stabilizing circuit;

the conversion circuit is connected between the power supply and the filter circuit, so as to convert the first voltage to the second voltage; and the voltage stabilizing circuit is connected to an output end of the filter circuit, so as to generate a third voltage according to the second voltage.

In one or more examples of the present disclosure, the conversion circuit includes a conversion chip, a fifteenth resistor, and a sixth capacitor; a first end of the conversion chip is connected to the power supply, a second end of the conversion chip is grounded, a third end of the conversion chip is connected to the power supply through the fifteenth resistor, and a fourth end of the conversion chip is not connected; and the sixth capacitor is connected between the first end and the second end of the conversion chip.

In one or more examples of the present disclosure, the filter circuit includes a fourteenth resistor, an eighth capacitor, a fourth diode, a third inductor, a sixteenth resistor, and a twentieth resistor; the fourteenth resistor is connected between a seventh end and an eighth end of the conversion chip, and the eighth capacitor is connected between the seventh end and a sixth end of the conversion chip; a first end of the third inductor is connected to the seventh end of the conversion chip and a second end of the fourth diode, a first end of the fourth diode is grounded, and a second end of the third inductor is connected to a first end of the sixteenth resistor; and a second end of the sixteenth resistor is connected to a first end of the twentieth resistor and a fifth end of the conversion chip, and a second end of the twentieth resistor is grounded.

In one or more examples of the present disclosure, the voltage stabilizing circuit includes a voltage stabilizing block, a first capacitor, and a second capacitor; an input end of the voltage stabilizing block is connected to a second end of a third inductor, and an output end of the voltage stabilizing block outputs the third voltage; a first end of the first capacitor is connected to the output end of the voltage stabilizing block, and a second end of the first capacitor is grounded; and a first end of the second capacitor is connected to the output end of the voltage stabilizing block, and a second end of the second capacitor is grounded.

In one or more examples of the present disclosure, the intelligent dual-mode electric floor brush further includes a thirteenth capacitor, a fourteenth capacitor, and a third diode, where a first end of the thirteenth capacitor is connected to the second end of the third inductor, and a second end of the thirteenth capacitor is grounded; a first end of the fourteenth capacitor is connected to the second end of the third inductor, and a second end of the fourteenth capacitor is grounded; and a first end of the third diode is connected to the first end of the fourteenth capacitor, and a second end of the third diode is connected to the input end of the floor brush motor.

In one or more examples of the present disclosure, the sampling unit includes a sampling circuit and an amplifying circuit;

an input end of the sampling circuit is connected to a negative electrode of the floor brush motor, and an output end of the sampling circuit is connected to the amplifying circuit; and the sampling circuit is configured to acquire the sampled current from the floor brush motor and amplify the sampled current through the amplifying circuit, so as to generate the sampled voltage.

In one or more examples of the present disclosure, the comparison unit includes a reference circuit and a comparison circuit;

the reference circuit is connected to the voltage stabilizing circuit and generates the reference voltage according to the third voltage; and an input end of the comparison circuit is connected to the reference circuit and the amplifying circuit, and an output end of the comparison circuit is connected to the switch unit to output a comparison voltage; where when a voltage value of the sampled voltage is higher than a voltage value of the reference voltage, the comparison voltage is at a high level; and when a voltage value of the sampled voltage is less than a voltage value of the reference voltage, the comparison voltage is at a low level.

In one or more examples of the present disclosure, the switch unit includes a bipolar junction transistor, a metal-oxide-semiconductor (MOS) field-effect transistor, an eighth resistor, and an eighteenth resistor;

a control end of the bipolar junction transistor is connected to the output end of the comparison circuit through the eighth resistor, a first end of the bipolar junction transistor is connected to a control end of the MOS field-effect transistor, and the second end of the bipolar junction transistor is grounded;

a first end of the MOS field-effect transistor is connected to the power supply, and a second end of the MOS field-effect transistor is connected to the input end of the floor brush motor; and the eighteenth resistor is connected between the first end and the control end of the MOS field-effect transistor; where when the comparison voltage is at the high level, the bipolar junction transistor communicates with the MOS field-effect transistor, and a voltage at the input end of the floor brush motor is the first voltage; and when the comparison voltage is at the low level, the bipolar junction transistor does not communicate with the MOS field-effect transistor, and a voltage at the input end of the floor brush motor is the second voltage.

In one or more examples of the present disclosure, the MOS field-effect transistor is a positive channel metal oxide semiconductor (PMOS) transistor, the control end of the MOS field-effect transistor is a gate, the first end of the MOS field-effect transistor is a source, and the second end of the MOS field-effect transistor is a drain.

In one or more examples of the present disclosure, the bipolar junction transistor is an NPN type bipolar junction transistor, the control end of the bipolar junction transistor is a base, the first end of the bipolar junction transistor is a collector, and a second end of the bipolar junction transistor is an emitter.

In one or more examples of the present disclosure, the sampling circuit includes a ninth resistor and a nineteenth resistor, the ninth resistor is connected between the output end of the floor brush motor and a ground voltage, a first end of the nineteenth resistor is connected to the output end of the floor brush motor, and a second end of the nineteenth resistor is connected to the amplifying circuit.

In one or more examples of the present disclosure, the amplifying circuit includes an amplifier, a twelfth resistor, and a thirteenth resistor;

a positive input end of the amplifier is connected to the second end of the nineteenth resistor;

a first end of the twelfth resistor is grounded, a second end of the twelfth resistor is connected to a first end of the thirteenth resistor, a second end of the thirteenth resistor is connected to an output end of the amplifier, and a negative input end of the amplifier is connected to the second end of the twelfth resistor; and the amplifier is further connected to the voltage stabilizing circuit to supply power at the third voltage.

In one or more examples of the present disclosure, the comparison circuit includes a comparator, a first resistor, a second resistor, a twenty-first resistor, and a light-emitting diode;

a positive input end of the comparator is connected to an output end of an amplifier through the first resistor, a negative input end of the comparator is connected to the reference voltage, an output end of the comparator is connected to the control end of the bipolar junction transistor through the eighth resistor, and the comparator is further connected to the voltage stabilizing circuit to supply power at the third voltage;

the second resistor is connected between the positive input end of the comparator and the output end of the comparator; and one end of the twenty-first resistor is connected to the output end of the comparator, the other end of the twenty-first resistor is connected to a first end of the light-emitting diode, and a second end of the light-emitting diode is grounded.

In one or more examples of the present disclosure, the reference circuit includes a third resistor and a tenth resistor, a first end of the tenth resistor is connected to the third voltage, a second end of the tenth resistor is connected to a first end of the third resistor and outputs the reference voltage, and a second end of the third resistor is grounded.

The present disclosure has the beneficial effects: the voltage of the floor brush motor is controlled by the control circuit. When working on a plane with low resistance such as a floor, the power supply outputs the second voltage Vout through the control circuit to supply power to the floor brush motor. When the electric floor brush works on a plane with high resistance such as a carpet, the current Id at the brush motor becomes higher as a load becomes greater, and the control circuit detects that the current Id becomes higher and then transfers the first voltage V1 to supply power to the brush motor, such that the electric floor brush works at power matching with the load. In the present disclosure, the control circuit is simple in structure, without complicated hardware such as a single chip microcomputer and an industrial personal computer, and low in production and manufacturing cost. In addition, in the present disclosure, the electric floor brush can output different magnitudes of power according to the load. Thus the cleaning efficiency can be improved, power consumption can be reduced, and a battery life of a vacuum cleaner can be prolonged.

Figure 1:
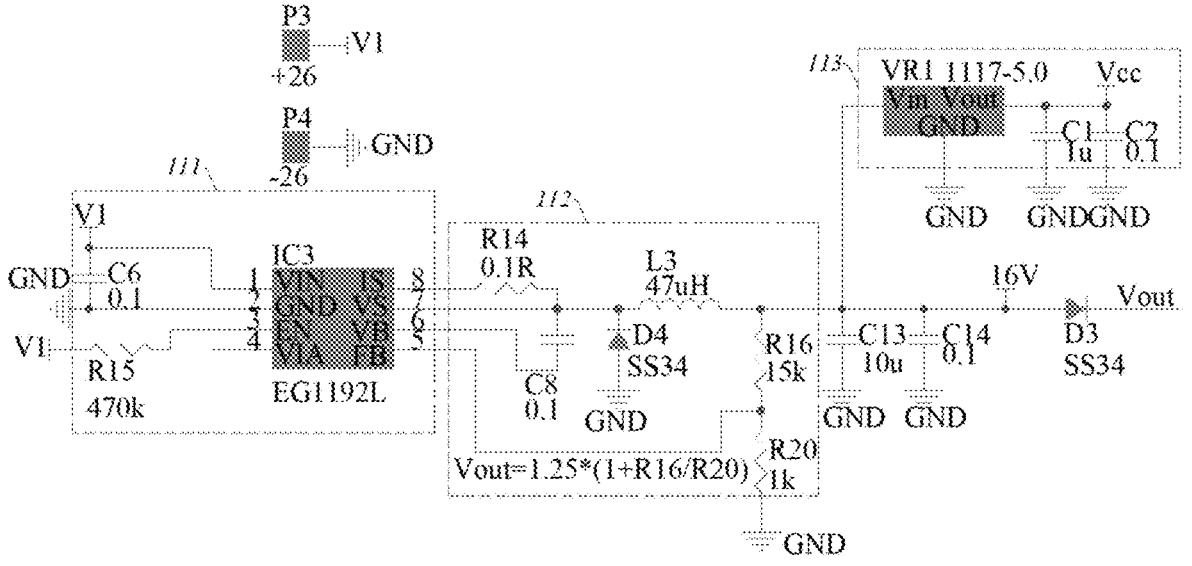
FIG. 1 is a circuit diagram of a conversion unit in an example of the present disclosure.

In the figures: control circuit 100, conversion unit 11, conversion circuit 112, filter circuit 112, voltage stabilizing circuit 113, switch unit 12, sampling unit 13, sampling circuit 131, amplifying circuit 132, comparison unit 14, comparison circuit 141, reference circuit 142, power supply 200, and floor brush motor 300.

DETAILED DESCRIPTION OF THE INVENTION

To make the technical solutions in the present disclosure to be better understood by a person of ordinary skill in the art, the technical solutions in the examples of the present disclosure will be clearly and completely described blow with reference to the accompanying drawings in the examples of the present disclosure. Apparently, the described examples are merely some examples rather than all examples of the present disclosure. All the other embodiments derived by a person skilled in the art from the examples of the present disclosure without creative efforts should fall within the protection scope of the present disclosure.

The word "coupled", "connected", or "connection" in the description includes direct connection and indirect connection. The indirect connection denotes connection through an intermediate medium, such as connection through an electrically conductive medium, which can have a parasitic first inductance or parasitic capacitance. The indirect connection can also include connection through another active device or passive device on the basis of achieving the same or similar functional purpose, such as connection through a switch, a follower circuit, or another circuit or a component. In addition, in the present disclosure, words such as "first" and "second" are mainly used to distinguish one technical feature from another technical feature, and do not necessarily require or imply that there is some actual relationship, quantity, or order between these technical features.

In the detailed description of the description, with reference made to the accompanying drawings that form a part hereof, the same reference numerals refer to the same parts throughout, and are shown through illustrative examples that may be implemented. It should be understood that another example may be utilized and structural or logical changes may be made without departing from the scope of the present disclosure. Thus, the following detailed description should not be considered as limitative.

Various operations in the description can be described as a plurality of discrete acts or operations in turn in a manner that is most helpful for understanding the claimed subject matter. However, the order of description should not be interpreted as implying that these operations should be order dependent. Specifically, these operations can be performed without complying with the order presented. The described operations can be performed in order different from the order in the described examples. Various additional operations can be performed in an additional example and/or the described operation may be omitted.

Various components and devices can be mentioned or shown in the singular herein merely for the convenience of discussion, and any element mentioned in the singular can include a plurality of such elements according to the teachings herein.

The phrase "in an example" or "in another example", or "in some examples" used in the description can refer to one or more of the same or different examples. In addition, the terms "comprise", "include", "have", etc. used in the examples of the present disclosure are synonymous.

As mentioned in the background, most of the devices used to control an electric floor brush in the prior art, such as an industrial personal computer or a single chip microcomputer, have high cost and occupy a large space, and thus are not conducive to the development of low cost and lightweight design of the electric floor brush.

In order to solve the problems, with reference to FIG. 1, the present disclosure provides an intelligent dual-mode electric floor brush. The intelligent dual-mode electric floor brush includes a control circuit 100 and a floor brush motor 300. The control circuit 100 is connected between a power supply 200 and the floor brush motor 300 to control a work voltage at the floor brush motor 300. The control circuit 100 includes a conversion unit 11, a sampling unit 13, a comparison unit 14, and a switch unit 12.

The conversion unit 11 is connected to an output end of the power supply 200 and an input end of the floor brush motor 300 and converts a first voltage V1 of the power supply 200 to a second voltage Vout. The sampling unit 13 is connected to an output end of the floor brush motor 300, so as to generate a sampled voltage Vd according to a sampled current Id at the floor brush motor 300. The comparison unit 14 is connected to the sampling unit 13, and the comparison unit 14 is configured to generate a reference voltage Ve and compare the reference voltage with the sampled voltage Vd to generate a switch voltage Vf. The switch unit 12 is connected to the comparison unit 14, the power supply 200, the conversion unit 11, and the floor brush motor 300 and transmits the first voltage or the second voltage to the floor brush motor 300 according to a state of the switch voltage Vf.

In this example, specific numerical values of the parameters in the present disclosure are determined according to actual situations. For example, the first voltage V1 may be 26 V, the second voltage Vout may be 16 V, the sampled current Id may be 0.8 A, the sampled voltage Vd may be 2.5 V, the reference voltage Ve may be 2.5 V, and the third voltage may be 5 V. A magnitude of the sampled current Id changes according to a work environment of the floor brush motor 300, and the greater the load is, the higher the value of the sampled current Id is. In this example, the specific numerical values of the parameters are merely for the convenience of implementation and explanation, and the values may be changed as needed in specific work. In this example, when the floor brush motor 300 works on a floor, a work voltage is the second voltage Vout. When the floor brush motor 300 works on a carpet, a work voltage is the first voltage V1.

In a further example, the conversion unit 11 includes a conversion circuit 111, a filter circuit 112, and a voltage stabilizing circuit 113. The conversion circuit 111 is connected between the power supply 200 and the filter circuit 112, so as to convert the first voltage V1 to the second voltage Vout. The voltage stabilizing circuit 113 is connected to an output end of the filter circuit 112, so as to generate a third voltage Vcc according to the second voltage Vout.

The conversion circuit 111 includes a conversion chip IC3, a fifteenth resistor R15, and a sixth capacitor C6. A first end of the conversion chip IC3 is connected to the first voltage V, a second end of the conversion chip is grounded, a third end of the conversion chip is connected to the first voltage V1 through the fifteenth resistor R15, and a fourth end of the conversion chip is not connected. The sixth capacitor C6 is connected between the first end and the second end of the conversion chip IC3.

The filter circuit 112 includes a fourteenth resistor R14, an eighth capacitor C8, a fourth diode D4, a third inductor L3, a sixteenth resistor R16, and a twentieth resistor R20. The fourteenth resistor R14 is connected between a seventh end and an eighth end of the conversion chip IC3, and the eighth capacitor C8 is connected between the seventh end and a sixth end of the conversion chip IC3. A first end of the third inductor L3 is connected to the seventh end of the conversion chip IC3 and a second end of the fourth diode D4, a first end of the fourth diode D4 is grounded, and a second end of the third inductor L3 is connected to a first end of the sixteenth resistor R16. A second end of the sixteenth resistor R16 is connected to a first end of the twentieth resistor R20 and a fifth end of the conversion chip IC3, and a second end of the twentieth resistor R20 is grounded. In this example, the conversion chip IC3 is configured to convert the first voltage V1 to the second voltage Vout, and the filter circuit performs filtering and noise reduction on the second voltage Vout.

The voltage stabilizing circuit 113 includes a voltage stabilizing block VR1, a first capacitor C1, and a second capacitor C2. An input end of the voltage stabilizing block VR1 is connected to a second end of a third inductor L3, and an output end of the voltage stabilizing block outputs the third voltage Vcc. A first end of the first capacitor C1 is connected to the output end of the voltage stabilizing block VR1, and a second end of the first capacitor is grounded. A first end of the second capacitor C2 is connected to the output end of the voltage stabilizing block VR1, and a second end of the second capacitor is grounded. The voltage stabilizing block VR1 is configured to generate the third voltage Vcc according to the second voltage Vout, and the third voltage Vcc is used to supply power to the sampling unit 13 and the comparison unit 14.

Figure 2:
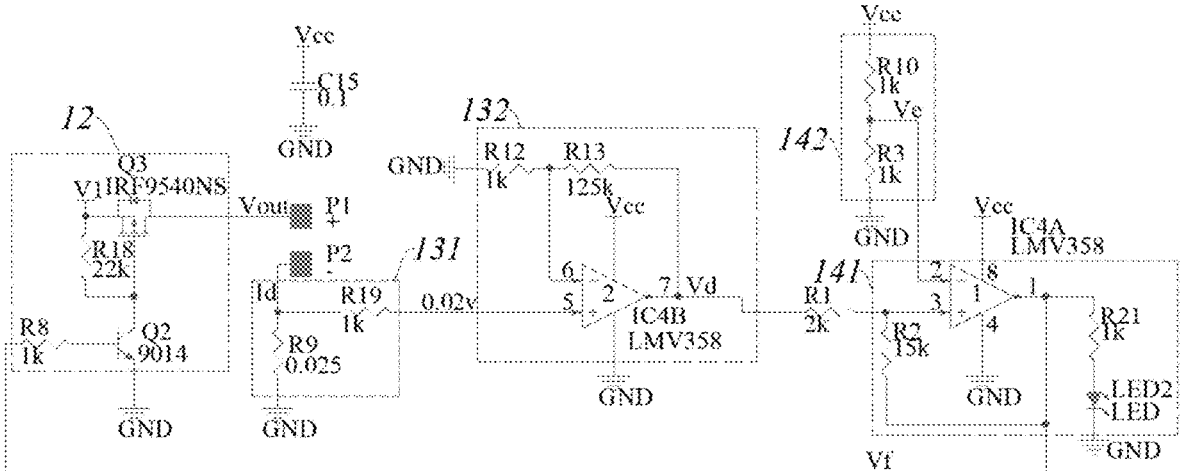
FIG. 2 is a circuit diagram of a control circuit in an example of the present disclosure.
Figure 3:
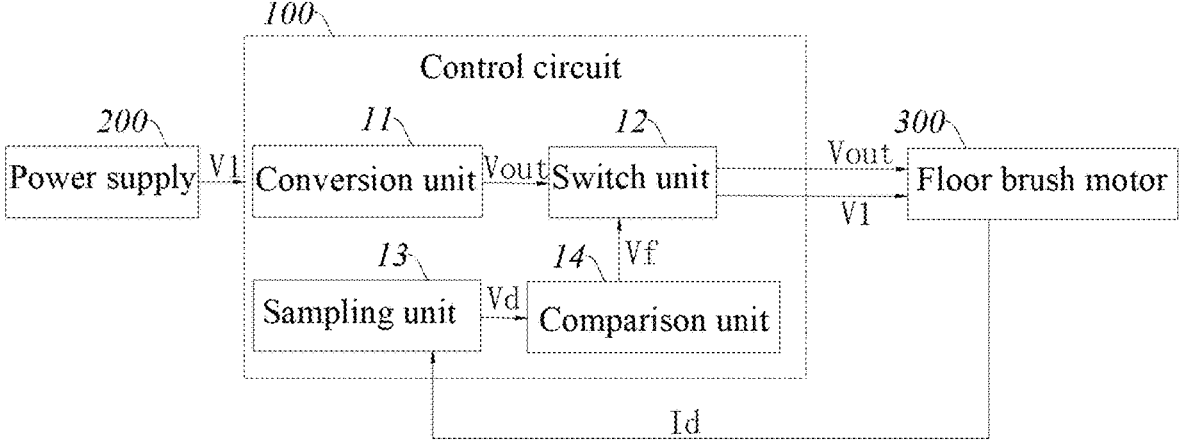
FIG. 3 is a schematic block diagram of an electric floor brush module in an example of the present disclosure.

In a further example, as shown in FIG. 2, the sampling unit 13 includes a sampling circuit 131 and an amplifying circuit 132. An input end of the sampling circuit 131 is connected to a negative electrode P2 of the floor brush motor 300, and an output end of the sampling circuit is connected to the amplifying circuit 132. The sampling circuit 131 is configured to acquire the sampled current Id from the floor brush motor 300 and amplify the sampled current through the amplifying circuit 132, so as to generate the sampled voltage Vd.

The comparison unit 14 includes a comparison circuit 141 and a reference circuit 142. The reference circuit 142 is connected to the voltage stabilizing circuit 113 and generates the reference voltage Ve according to the third voltage Vcc. An input end of the comparison circuit 141 is connected to the reference circuit 142 and the amplifying circuit 132, and an output end of the comparison circuit 141 is connected to the switch unit 12 to output a comparison voltage Vf.

When a voltage value of the sampled voltage Vd is higher than a voltage value of the reference voltage Ve, the comparison voltage Vf is at a high level.

When a voltage value of the sampled voltage Vd is less than a voltage value of the reference voltage Ve, the comparison voltage Vf is at a low level.

In a further example, the switch unit 12 includes a bipolar junction transistor Q2, a metal-oxide-semiconductor (MOS) field-effect transistor Q3, an eighth resistor R8, and an eighteenth resistor R18. A control end of the bipolar junction transistor Q2 is connected to the output end of the comparison circuit 141 through the eighth resistor R8, a first end of the bipolar junction transistor Q2 is connected to a control end of the MOS field-effect transistor Q3, and the first end of the bipolar junction transistor Q2 is grounded. A first end of the MOS field-effect transistor Q3 is connected to the power supply 200, and a second end of the MOS field-effect transistor is connected to the input end of the floor brush motor 300. The eighteenth resistor R18 is connected between the first end and the control end of the MOS field-effect transistor Q3.

When the comparison voltage is at the high level, the bipolar junction transistor Q2 communicates with the MOS field-effect transistor Q3, and a voltage at the input end of the floor brush motor 300 is the first voltage V1.

When the comparison voltage is at the low level, the bipolar junction transistor Q2 does not communicate with the MOS field-effect transistor Q3, and a voltage at the input end of the floor brush motor 300 is the second voltage Vout.

In this example, the control end of the bipolar junction transistor Q2 is a base, the first end of the bipolar junction transistor is a collector, and a second end of the bipolar junction transistor is an emitter. The MOS field-effect transistor Q3 is a positive channel metal oxide semiconductor (PMOS) transistor, the first end of the transistor is a source, the second end of the transistor is a drain, and the control end of the transistor is a gate.

In a further example, the sampling circuit 131 includes a ninth resistor R9 and a nineteenth resistor R19, the ninth resistor R9 is connected between the output end P2 of the floor brush motor 300 and a ground voltage, a first end of the nineteenth resistor R19 is connected to the output end of the floor brush motor 300, and a second end of the nineteenth resistor R19 is connected to the amplifying circuit 132.

In a further example, the amplifying circuit 132 includes an amplifier IC4B, a twelfth resistor R12, and a thirteenth resistor R13. A positive input end of the amplifier IC4B is connected to the second end of the nineteenth resistor R19. A first end of the twelfth resistor R12 is grounded, a second end of the twelfth resistor is connected to a first end of the thirteenth resistor R13, a second end of the thirteenth resistor R13 is connected to an output end of the amplifier IC4B, and a negative input end of the amplifier IC4B is connected to the second end of the twelfth resistor R12. The amplifier IC4B is further connected to the voltage stabilizing circuit to supply power at the third voltage Vcc.

In this example, the positive input end of the amplifier IC4B samples a voltage at the ninth resistor R9 through the nineteenth resistor R19 and amplifies the voltage to 125 times to obtain the sampled voltage Vd. An amplification factor may be adjusted based on a value of the twelfth resistor R12 and a value of the thirteenth resistor R13.

The comparison circuit 141 includes a comparator IC4A, a first resistor R1, a second resistor R2, a twenty-first resistor R21, and a light-emitting diode LED. A positive input end of the comparator IC4A is connected to an output end of an amplifier IC4B through the first resistor, a negative input end of the comparator IC4A is connected to the reference voltage Ve, an output end of the comparator is connected to the control end of the bipolar junction transistor Q2 through the eighth resistor R8, and the comparator IC4A is further connected to the voltage stabilizing circuit 113 to supply power at the third voltage Vcc. The second resistor R2 is connected between the positive input end of the comparator IC4A and the output end of the comparator. One end of the twenty-first resistor R21 is connected to the output end of the comparator IC4A, the other end of the twenty-first resistor is connected to a first end of the light-emitting diode LED, and a second end of the light-emitting diode LED is grounded. In this example, the light-emitting diode LED is connected to the output end of the comparator IC4A to display the comparison voltage Vf, thereby determining a work state of the electric floor brush.

In this example, the comparator IC4A compares the sampled voltage Vd with the reference voltage Ve. In this example, the reference voltage Ve is 2.5 V. That is, the corresponding sampled current Id at the floor brush motor 300 is 0.025 A. The value of the reference voltage Ve is a critical value. The critical value may be adjusted based on a value of the ninth resistor R9 and a value of the nineteenth resistor R19, so as to adapt to different types of floor brush motors 300 or different work environments.

In a further example of the present disclosure, the reference circuit 142 includes a third resistor R3 and a tenth resistor R10, a first end of the tenth resistor R10 is connected to the third voltage Vcc, a second end of the tenth resistor is connected to a first end of the third resistor R3 and outputs the reference voltage Ve, and a second end of the third resistor R3 is grounded.

In this example, the floor brush motor 300 has two work modes. When the floor brush motor 300 works on the floor or on a plane with low resistance, the value of the sampled current Id at the floor brush motor 300 is low, and the sampled voltage Vd is lower than the reference voltage Ve. Then, a signal outputted by the output end of the comparator IC4A is at the low level, the bipolar junction transistor Q2 does not communicate, and the voltage at the control end of the MOS field-effect transistor is pulled up to the first voltage V1 by the eighteenth resistor R18. Then, the MOS field-effect transistor is in a non-communicating state, the second voltage Vout outputted by the conversion circuit 11 supplies power to the floor brush motor.

When the floor brush motor 300 works on the carpet or an environment with high resistance, the value of the sampled current Id becomes high. Further, the sampled voltage Vd is higher than the reference voltage Ve, such that a signal outputted by the comparator IC4A is at the high level, the bipolar junction transistor Q2 communicates, and the voltage of the control end of the MOS field-effect transistor is further pulled down to the ground voltage. The MOS field-effect transistor is in communication and is supplied with power at the first voltage V1, and the power of the floor brush motor 300 is increased accordingly. The output end of the third inductor L3 is also connected in series to the third diode D3, the first end of the third diode is connected to the third inductor L3, and the other end of the third diode is connected to the input end P2 of the floor brush motor 300. The third diode is configured to prevent damage to an electrical component caused by backflow of the first voltage V1 of the power supply 200 to the second voltage Vout when the MOS field-effect transistor is in communication.

The embodiments described above are merely used for describing the technical conception and features of the present disclosure, aim at enabling a person skilled in the art to know and implement the contents of the present disclosure, and cannot be used as limitation to the protection scope of the present disclosure. All equivalent changes or modifications made according to the spirit of the present disclosure should fall within the protection scope of the present disclosure.

The invention claimed is:

1. An intelligent dual-mode electric floor brush, comprising a control circuit (100) and a floor brush motor (300), wherein the control circuit (100) is connected between a power supply (200) and the floor brush motor (300) to control a work voltage at the floor brush motor (300), and the control circuit (100) comprises:

a conversion unit (11) that is connected to an output end of the power supply (200) and an input end of the floor brush motor (300) and converts a first voltage of the power supply (200) to a second voltage;

a sampling unit (13) connected to an output end of the floor brush motor (300), so as to generate a sampled voltage according to a sampled current at the floor brush motor (300);

a comparison unit (14) connected to the sampling unit (13), wherein the comparison unit (14) is configured to generate a reference voltage and compare the reference voltage with the sampled voltage to generate a switch voltage; and a switch unit (12) that is connected to the comparison unit (14), the power supply (200), the conversion unit (11), and the floor brush motor (300) and transmits the first voltage or the second voltage to the floor brush motor (300) according to a state of the switch voltage;

wherein, the conversion unit (11) comprises a conversion circuit (111), a filter circuit (112), and a voltage stabilizing circuit (113);

the conversion circuit (111) is connected between the power supply (200) and the filter circuit (112), so as to convert the first voltage to the second voltage; and the voltage stabilizing circuit (113) is connected to an output end of the filter circuit (112), so as to generate a third voltage according to the second voltage;

the sampling unit (13) comprises a sampling circuit (131) and an amplifying circuit (132); an input end of the sampling circuit (131) is connected to a negative electrode of the floor brush motor (300), and an output end of the sampling circuit is connected to the amplifying circuit (132); and the sampling circuit (131) is configured to acquire the sampled current from the floor brush motor (300) and amplify the sampled current through the amplifying circuit (132), so as to generate the sampled voltage;

the comparison unit comprises a reference circuit (142) and a comparison circuit (141); wherein the reference circuit (142) is connected to the voltage stabilizing circuit (113) and generates the reference voltage according to the third voltage; and an input end of the comparison circuit (141) is connected to the reference circuit (142) and the amplifying circuit, and an output end of the comparison circuit (141) is connected to the switch unit (12) to output a comparison voltage;

when a voltage value of the sampled voltage is higher than a voltage value of the reference voltage, the comparison voltage is at a high level; and when a voltage value of the sampled voltage is less than a voltage value of the reference voltage, the comparison voltage is at a low level.

2. The intelligent dual-mode electric floor brush according to claim 1, wherein the conversion circuit (111) comprises a conversion chip, a fifteenth resistor, and a sixth capacitor; a first end of the conversion chip is connected to the power supply (200), a second end of the conversion chip is grounded, a third end of the conversion chip is connected to the power supply (200) through the fifteenth resistor, and a fourth end of the conversion chip is not connected; and the sixth capacitor is connected between the first end and the second end of the conversion chip.

3. The intelligent dual-mode electric floor brush according to claim 2, wherein the filter circuit (112) comprises a fourteenth resistor, an eighth capacitor, a fourth diode, a third inductor, a sixteenth resistor, and a twentieth resistor; the fourteenth resistor is connected between a seventh end and an eighth end of the conversion chip, and the eighth capacitor is connected between the seventh end and a sixth end of the conversion chip; a first end of the third inductor is connected to the seventh end of the conversion chip and a second end of the fourth diode, a first end of the fourth diode is grounded, and a second end of the third inductor is connected to a first end of the sixteenth resistor; and a second end of the sixteenth resistor is connected to a first end of the twentieth resistor and a fifth end of the conversion chip, and a second end of the twentieth resistor is grounded.

4. The intelligent dual-mode electric floor brush according to claim 3, further comprising a thirteenth capacitor, a fourteenth capacitor, and a third diode, wherein a first end of the thirteenth capacitor is connected to the second end of the third inductor, and a second end of the thirteenth capacitor is grounded; a first end of the fourteenth capacitor is connected to the second end of the third inductor, and a second end of the fourteenth capacitor is grounded; and a first end of the third diode is connected to the first end of the fourteenth capacitor, and a second end of the third diode is connected to the input end of the floor brush motor (300).

5. The intelligent dual-mode electric floor brush according to claim 2, wherein the voltage stabilizing circuit (113) comprises a voltage stabilizing block, a first capacitor, and a second capacitor; an input end of the voltage stabilizing block is connected to a second end of a third inductor, and an output end of the voltage stabilizing block outputs the third voltage; a first end of the first capacitor is connected to the output end of the voltage stabilizing block, and a second end of the first capacitor is grounded; and a first end of the second capacitor is connected to the output end of the voltage stabilizing block, and a second end of the second capacitor is grounded.

6. The intelligent dual-mode electric floor brush according to claim 1, wherein the switch unit (12) comprises a bipolar junction transistor, a metal-oxide-semiconductor (MOS) field-effect transistor, an eighth resistor, and an eighteenth resistor;

a control end of the bipolar junction transistor is connected to the output end of the comparison circuit (141) through the eighth resistor, a first end of the bipolar junction transistor is connected to a control end of the MOS field-effect transistor, and the second end of the bipolar junction transistor is grounded;

a first end of the MOS field-effect transistor is connected to the power supply (200), and a second end of the MOS field-effect transistor is connected to the input end of the floor brush motor (300); and the eighteenth resistor is connected between the first end and the control end of the MOS field-effect transistor; wherein when the comparison voltage is at the high level, the bipolar junction transistor communicates with the MOS field-effect transistor, and a voltage at the input end of the floor brush motor (300) is the first voltage; and when the comparison voltage is at the low level, the bipolar junction transistor does not communicate with the MOS field-effect transistor, and a voltage at the input end of the floor brush motor (300) is the second voltage.

7. The intelligent dual-mode electric floor brush according to claim 6, wherein the MOS field-effect transistor is a positive channel metal oxide semiconductor (PMOS) transistor, the control end of the MOS field-effect transistor is a gate, the first end of the MOS field-effect transistor is a source, and the second end of the MOS field-effect transistor is a drain.

8. The intelligent dual-mode electric floor brush according to claim 6, wherein the bipolar junction transistor is an NPN type bipolar junction transistor, the control end of the bipolar junction transistor is a base, the first end of the bipolar junction transistor is a collector, and a second end of the bipolar junction transistor is an emitter.

9. The intelligent dual-mode electric floor brush according to claim 6, wherein the comparison circuit (141) comprises a comparator, a first resistor, a second resistor, a twenty-first resistor, and a light-emitting diode;

a positive input end of the comparator is connected to an output end of an amplifier through the first resistor, a negative input end of the comparator is connected to the reference voltage, an output end of the comparator is connected to the control end of the bipolar junction transistor through the eighth resistor, and the comparator is further connected to the voltage stabilizing circuit to supply power at the third voltage;

the second resistor is connected between the positive input end of the comparator and the output end of the comparator; and one end of the twenty-first resistor is connected to the output end of the comparator, the other end of the twenty-first resistor is connected to a first end of the light-emitting diode, and a second end of the light-emitting diode is grounded.

10. The intelligent dual-mode electric floor brush according to claim 1, wherein the sampling circuit (131) comprises a ninth resistor and a nineteenth resistor, the ninth resistor is connected between the output end of the floor brush motor (300) and a ground voltage, a first end of the nineteenth resistor is connected to the output end of the floor brush motor (300), and a second end of the nineteenth resistor is connected to the amplifying circuit (132).

11. The intelligent dual-mode electric floor brush according to claim 10, wherein the amplifying circuit (132) comprises an amplifier, a twelfth resistor, and a thirteenth resistor;

a positive input end of the amplifier is connected to the second end of the nineteenth resistor;

a first end of the twelfth resistor is grounded, a second end of the twelfth resistor is connected to a first end of the thirteenth resistor, a second end of the thirteenth resistor is connected to an output end of the amplifier, and a negative input end of the amplifier is connected to the second end of the twelfth resistor; and the amplifier is further connected to the voltage stabilizing circuit (113) to supply power at the third voltage.

12. The intelligent dual-mode electric floor brush according to claim 11, wherein the reference circuit (142) comprises a third resistor and a tenth resistor, a first end of the tenth resistor is connected to the third voltage, a second end of the tenth resistor is connected to a first end of the third resistor and outputs.

\* \* \* \* \*